| United States Patent [19] | [11] Patent Number: 4,864,904 |
|---|---|
| Mishiro | [45] Date of Patent: Sep. 12, 1989 |

[54] ULTRASONIC VIBRATIONAL CUTTING APPARATUS

[75] Inventor: Shoji Mishiro, Kawasaki, Japan

[73] Assignee: Taga Electric Co., Ltd., Tokyo, Japan

[21] Appl. No.: 163,095

[22] Filed: Mar. 2, 1988

[30] Foreign Application Priority Data

Mar. 3, 1987 [JP] Japan ................................. 62-48290
Mar. 20, 1987 [JP] Japan ................................. 62-67326

[51] Int. Cl.⁴ ............................................ B23B 21/04
[52] U.S. Cl. ........................................ 82/137; 82/904
[58] Field of Search ................. 82/137, 904, 134, 1 C, 82/36 R, 34 R

[56] References Cited

U.S. PATENT DOCUMENTS

| 3,739,665 | 6/1973 | Kumabe et al. | 407/120 |
| 3,754,487 | 8/1973 | Nachtigal | 82/DIG. 9 |
| 4,602,340 | 7/1986 | Murofushi et al. | 82/24 R |
| 4,620,121 | 10/1986 | Mishiro | 82/DIG. 9 |
| 4,728,843 | 3/1988 | Mishiro | 310/325 |

Primary Examiner—Frederick R. Schmidt
Assistant Examiner—Lawrence Cruz
Attorney, Agent, or Firm—Oblon, Spivak, McClelland, Maier & Neustadt

[57] ABSTRACT

The present invention includes a radial force detection mechanism for detecting a radial force generated by cutting operation of a cutting tool by use of an ultrasonic vibrator, a depth-of-cut feed mechanism for moving the cutting tool in the depth-of-cut direction, and a vertical feed mechanism for controlling the vertical position of the cutting tool, combined with correction of its movement in the depth-of-cut direction by the depth-of-cut feed mechanism, so as to bring it to the position where a radial force detection signal detected by the radial force detection mechanism becomes zero. By moving the cutting tool in the vertical direction by use of the vertical feed mechanism so that the radial force detection signal may become zero, no radial force is applied to the cutting tool.

6 Claims, 7 Drawing Sheets

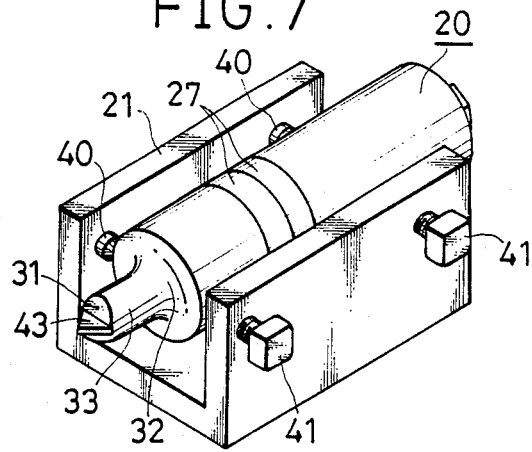
FIG. 7
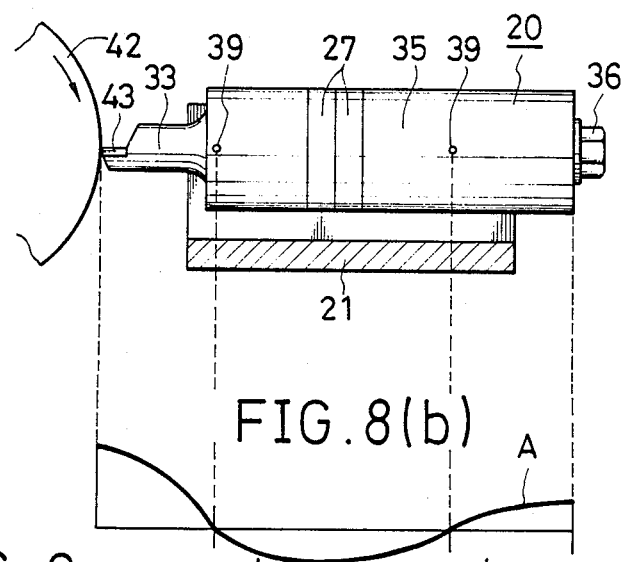
FIG. 8(a)
FIG. 8(b)
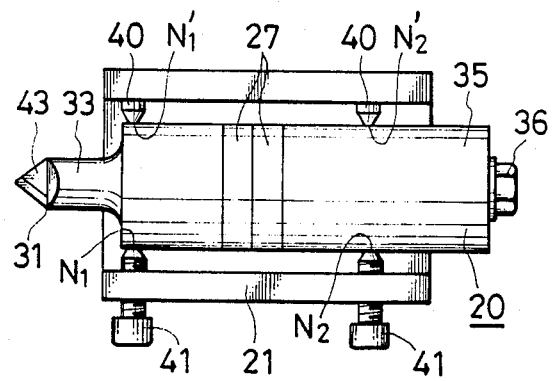
FIG. 9

ULTRASONIC VIBRATIONAL CUTTING APPARATUS

FIELD OF THE INVENTION

The present invention relates to an ultrasonic vibrational cutting apparatus such as an ultrasonic vibrational cutting NC lathe for cutting a workpiece by vibrating a cutting tool in the cutting direction by ultrasonic vibration, and more particularly, to an ultrasonic vibrational cutting apparatus adapted such that radial force generated therein can be corrected.

DISCUSSION OF THE BACKGROUND

It is generally known, by on arrangement such that cutting operation is performed in a cutting apparatus such as a lathe, planer, and shaper with a cutting tool driven by ultrasonic vibration, that various effects are obtained such as that the cutting resistance is greatly reduced and abnormal vibrations such as chattering are eliminated. As a result, the accuracy in the processing in terms of out-of-roundness, surface roughness, etc. is improved and the cutting tool is prolonged in its life, and further, materials difficult to cut become easy to process.

FIG. 1 shows an example of prior art ultrasonic vibrational cutting apparatus. On a tool rest 1, there is supported a tool shank (tool holder) 5 subjected to bending (flexural) vibration a held in place by a presser plate 2, fastening bolts 3, and a fastening jig 4, in which the fastening jig 4 is arranged such that its legs are located at nodal positions of the tool shank 5. At one end of the tool shank 5, there is fixed a cutting tool 7 to face a workpiece 6. On the side of the other end of the tool shank 5, there are provided an axial vibrator 8 and an amplitude expanding horn 9 joined thereto at the position of loop of the vibrational pattern of the tool shank 5 as indicated by single-dot chain lines.

In the ultrasonic vibrational cutting apparatus arranged as aforesaid, when the axial vibrator 8 is driven by an ultrasonic oscillating device (not shown), the tool shank 5 vibrates as indicated by the single-dot chain lines in the figure and thereby the edge of the cutting tool 7 undergoes an ultrasonic vibration in the cutting direction and exhibits the above described vibrational cutting effects. More specifically, by representing the cutting speed of the workpiece 6 by v, the vibrating frequency of the vibrational cutting tool 7 by f, and the amplitude by a, the effects are exhibited under the condition of $v < 2\pi f a$.

According to the above described arrangement, since the axial vibrator 8 as the source of the ultrasonic vibration can be installed at a position far away from the cutting tool 7, there is an advantage in that the same can be easily installed on a general-purpose lathe.

However, at the contact point of the cutting tool 7 with the workpiece 6, there is produced, other than a principal force $P_c$ acting in the tangential direction toward the workpiece, a radial force $P_t$ acting in the radial direction toward the cutting tool 7. As a result, the resultant P of these forces is applied to the cutting tool 7 and produces harmful abnormal vibrations. Therefore, in many cases, an apparatus providing only a simple vibration in the tangential direction cannot provide satisfactory cutting effects.

Therefore, there are proposed some apparatues, as disclosed, for example, in Japanese Patent Publication No. 50-20289, arranged such that the vibrational cutting is performed therein with the tool shank 5 tilted so that the vibrating direction of the cutting tool 7 will agree with the direction of the resultant cutting resistance P. Namely, as shown in FIG. 3 corresponding with FIG. 1, a tilting table 12 is provided between the tool rest 11 and tool base-plate 10, whereby the tool shank 5 is tilted through an angle $\theta$, the angle formed between the tangential force $P_c$ and the resultant P. Here, such an angle of inclination $\theta$ can be obtained by measuring, in FIG. 1, the radial force acting in the direction perpendicular to the vibration of the cutting tool 7 and the force acting in the cutting direction.

By thus bringing the vibrating direction of the cutting tool 7 into agreement with the direction of the resultant resistance force P, no radial force $P_t$ acts in the axial direction of the cutting tool 7 and good vibrational cutting effects can be obtained.

There are, however, some problems with such prior art arrangement, which will be described below. The radial force $P_t$ is variable depending upon cutting conditions, for example, the change in the depth of cutting, or cutting speed, or difference in materials of the work piece. As a result, it becomes necessary, every time the cutting condition is changed, to exchange the tilting table 12 for another one with a different tilting angle, or to use a tilting table 12 whose angle of inclination is variable and adjust the angle. Therefore, if a wide variety of workpieces are to be processed, the setup of the angles becomes very complicated.

With respect to the means for measuring the radial force $P_t$, many are provided with a stress sensor disposed on the depth-of-cut feed mechanism because generally it is only necessary to detect the stress applied to the cutting tool 7 in the direction perpendicular to the cutting direction. However, if it is desired to monitor the stress acting on the cutting tool 7 during the cutting operation using a prior art apparatus as shown in FIG. 3 with the tool shank 5 tilted, the stress to which the depth-of-cut feed mechanism is subjected is different from the stress perpendicular to the vibration of the cutting tool 7. More specifically, in order that the stress applied to the cutting tool 7 is detected in such a system as shown in FIG. 3, the stress sensor must not be provided on the depth-of-cut feed mechanism, but the stress in the axial line of the tool shank 5 must be measured. However, such a tool shank 5 or the mechanism for holding it constitutes the ultrasonic vibrating system and therefore it is difficult to provide a stress sensor on such a portion.

SUMMARY OF THE INVENTION

An object of the present invention is to provide an ultrasonic vibrational cutting apparatus in which correction of radial force can be easily executed.

Another object of the present invention is to provide an ultrasonic vibrational cutting apparatus in which detection of the radial force can be correctly executed.

To achieve the above mentioned objects, the ultrasonic vibrational cutting apparatus of the present invention comprises an ultrasonic vibrator, a radial force detection means for detecting a radial force generated by cutting operation of a cutting tool by means of the ultrasonic vibrator, a depth-of-cut feed mechanism, and a vertical feed mechanism for controlling the vertical position of the cutting tool, combined with correction of its movement in the depth-of-cut direction by the depth-of-cut feed mechanism, to bring it to the position where a radial force detection signal detected by the radial force detection means becomes zero. The term "a radial force detection signal" used herein is defined as a detection signal of a stress applied to the cutting tool in the direction perpendicular to the vibration of the edge of the cutting tool. Thus, by moving the cutting tool in the vertical direction so that the radial force detection signal may become zero by means of the vertical feed mechanism, such operating conditions are produced in which no radial force is applied to the cutting tool, no abnormal vibrations are caused, and a good surface finish is provided by the cutting.

When a cutting tool is provided at the output end portion at one end of a flexural vibrator, which is provided by fastening together one or more electrostrictive element bodies, each is polarized in the direction of its thickness and divided equally into two halves, metallic members are disposed on both faces of the element bodies, a differential detection means is provided for detecting an axial vibrating stress applied at equal phasic timing to both the two halves of the electrostrictive element, and the radial force applied to the ultrasonic vibrator itself can be detected as the radial force detection signal with high detection accuracy.

A more complete appreciation of the invention and many of the attendant advantages thereof will be readily obtained as the same becomes better understood by reference to the following detailed description when considered in connection with the accompanying drawings, wherein:

BRIEF DESCRIPTION OF THE DRAWINGS

FIG. 7 is a perspective view schematically showing a flexural vibrator supported in a holder;

FIG. 8($d$) is a side view in longitudinal section of the vibrator and its vibrational pattern and FIG. 8($b$) shows resonant vibration;

FIG. 9 is a side view of the same;

DESCRIPTION OF THE PREFERRED EMBODIMENTS

Figure 1:
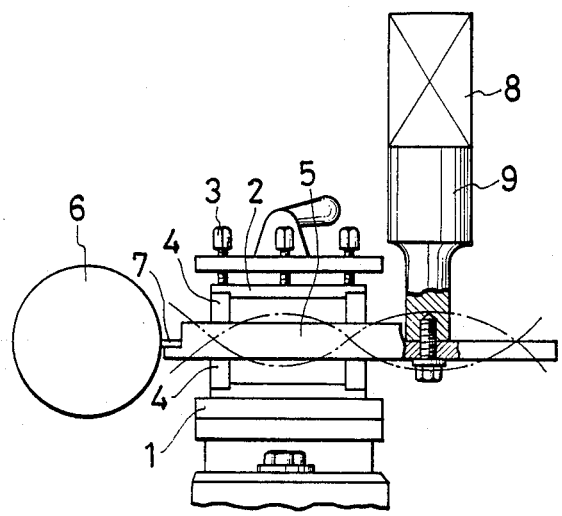
FIG. 1 is a side view showing a prior art example.
Figure 2:
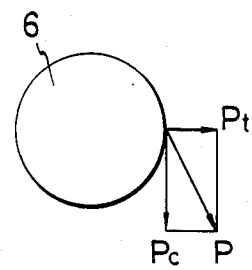
FIG. 2 is a side view showing directions of forces.
Figure 3:
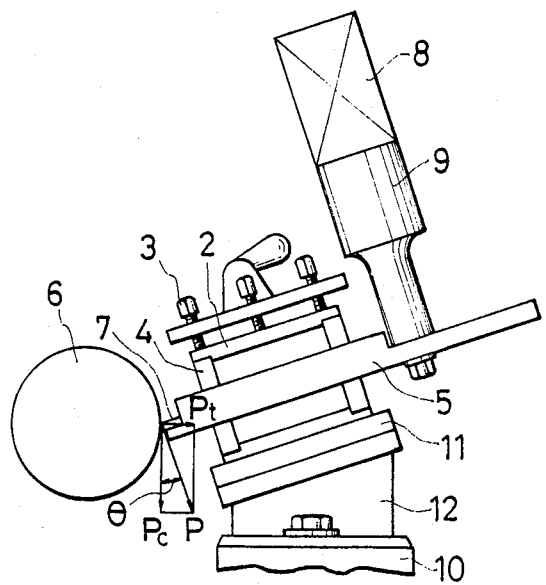
FIG. 3 is a side view showing a prior art method for correcting the radial force.
Figure 4:
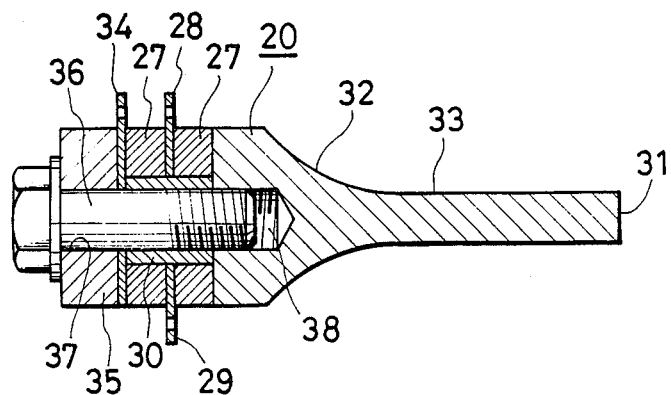
FIG. 4 is a longitudinal sectional view showing basic structure of a flexural vibrator for use in a first embodiment of the present invention.
Figure 5:
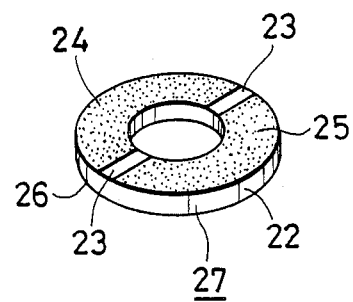
FIG. 5 is a perspective view of an electrostrictive element.
Figure 6:
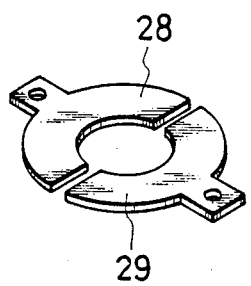
FIG. 6 is a perspective view of electrode plates.

A first embodiment of the present invention will be described with reference to FIG. 4 to FIG. 12. Firstly, a flexural vibrator 20 for use in the present embodiment will be described as to its fundamental structure and vibrational operation with reference to FIGS. 4 to 6. The aforementioned flexural vibrator 20 is equivalent, for example, to that already proposed in U.S. Pat. No. 4,728,843 by the present applicant. First, an electrostrictive element body 22 of an annular form and polarized in the direction of its thickness as shown in FIG. 5 is provided; on one face of the electrostrictive element body 22, there are formed electrodes 24, 25 divided in two by an insulating portion 23, whereas on the other face, there is formed a common electrode 26 as an electrode covering the entire surface, and an electrostrictive element 27 is structured of these parts. Two pieces, for example, of such electrostrictive elements 27 are prepared and the same are disposed so that the electrodes 24, 25 oppose each other and the insulating portions 23 are arranged in the same direction with two U-shaped electrode plates 28, 29 as shown in FIG. 6 interposed therebetween, and an insulating cylinder 30 is inserted in the center of these parts. To the surface of the common electrode 26 of one of the electrostrictive element 27 is joined a metallic member 33, which has a small-diametered output end portion 31 and an exponential step portion 32 for magnifying the vibrating amplitude. To the surface of the common electrode 26 of the other electrostrictive element 27 is joined a common electrode plate 34, and to this common electrode plate 34 is joined a metallic member 35. And these members are integrally fixed by a bolt 36 as a fastening member. That is, the metallic member 35 has a hole 37 made therein for passing the bolt 36 therethrough, whereas the metallic member 33 is provided with a threaded portion 38 formed therein for threaded engagement with the bolt 36. In this manner, the flexural vibrator 20 for use in the present embodiment of a vibrator composite design is constructed.

Here, the flexural vibrator 20 is connected, for example, with a later discussed drive control circuit at the electrodes 24, 25 and the common electrode 26 through the electrode plates 28, 29 and the common electrode plate 34 and is thereby excited and driven.

That is, the driving power source, which is capable of supplying voltages whose phases are controlled independently of each other, is connected between the electrode plates 28, 29 and the common electrode plate 34 and the driving frequency is set to the resonant frequency in the axial direction. When the phase difference is set to zero, in-phase parallel driving is effected, and thereby, the output end portion 31 produces an axial resonant vibration, i.e., it vibrates in a vibrating pattern like that of an axial vibrator. However, if the driving voltage to be applied to one electrode plate 29 is inverted with respect to that to be applied to the other electrode plate 28, that is, if voltages 180° out of phase are applied to the electrode plates, the output end portion 31 comes to produce a flexural resonant vibration perpendicular to the axis and in the divided direction of the electrostrictive element 27 (i.e., an up-and-down direction in the state shown in FIG. 4). It should be noted here that the aforesaid vibrations are exhibited when the directions of polarization in the divided portions in two of the electrostrictive element 27 are the same. If the directions of polarization in the divided portions in two of the electrostrictive element 27 are opposite, flexural vibration is exhibited when the phase difference is zero, and the vibration in the vibrating pattern, the same as that of the axial vibrator, is exhibited when the phases are 180° out of phase.

The operating principle of the flexural vibrator 20 for use in the present embodiment will now be described. Such a flexural vibrator 20 in practice is supported within a holder 21 made in a channel-like form as shown in FIGS. 7 to 9. Incidentally, in these drawings, the flexural vibrator 20 of the above described construction is only shown schematically. The flexural vibrator 20 is adapted so as to make a flexural resonance at one-wavelength in its axial direction, for example, as indicated by the characteristic A of vibrational displacement distribution in FIG. 8(b). The flexural vibrator 20 is provided with conical indentations 39 formed therein located at four nodal positions $N_1$, $N_2$, $N_1'$, $N_2'$ on its both sides. The conical indentations 39 at the nodal positions $N_1'$, $N_2'$ thereof are engaged with two sharp-pointed pins 40 fixed to the holder 21, whereas the conical indents 39 at the nodal positions $N_1$, $N_2$ are engaged with two sharp-pointed pins 41 which are fitted to the holder 21 for advancing and retreating, and the flexural vibrator 20 is adapted to be fixedly supported within the holder 21 from both sides by tightening the sharp-pointed pins 41. In short, the flexural vibrator 20 is supported in a point abutting state at its four nodal positions.

The portion of the flexural vibrator 20 from the output end portion 31 to the vicinity of the first nodal positions $N_1$, $N_1'$, including the exponential step portion 32, is formed in a small-diametered step horn so that the vibrational displacement at the output end portion 31 may be expanded. To the output end portion 31 of such flexural vibrator 20 is directly attached a cutting tool 43 such as a tool for making cutting work of a workpiece 42.

When the flexural vibrator 20 with the cutting tool 43 attached to its output end portion 31 is used supported in the holder 21 and this flexural vibrator 20 is caused to undergo a flexural vibration, the cutting tool 43 at the output end portion 31 produces a large resonant up and down vibration in the state as indicated in FIG. 8(a). Therefore, as the tip of the cutting tool 43 is pressed against the workpiece 42 rotating in the direction as indicated by the arrow, vibrational cutting work is performed on the workpiece 42.

The vibration system including such holder 21 is supported within a saddle 44 as shown in FIG. 10 through a depth-of-cut feed mechanism 45 and a vertical feed mechanism 46, and it is adapted such that the amount of movement in the depth-of-cut direction (direction X) and the amount of movement in the vertical direction (direction Y) of the vibration system are controlled by these mechanisms 45, 46.

Figure 11:
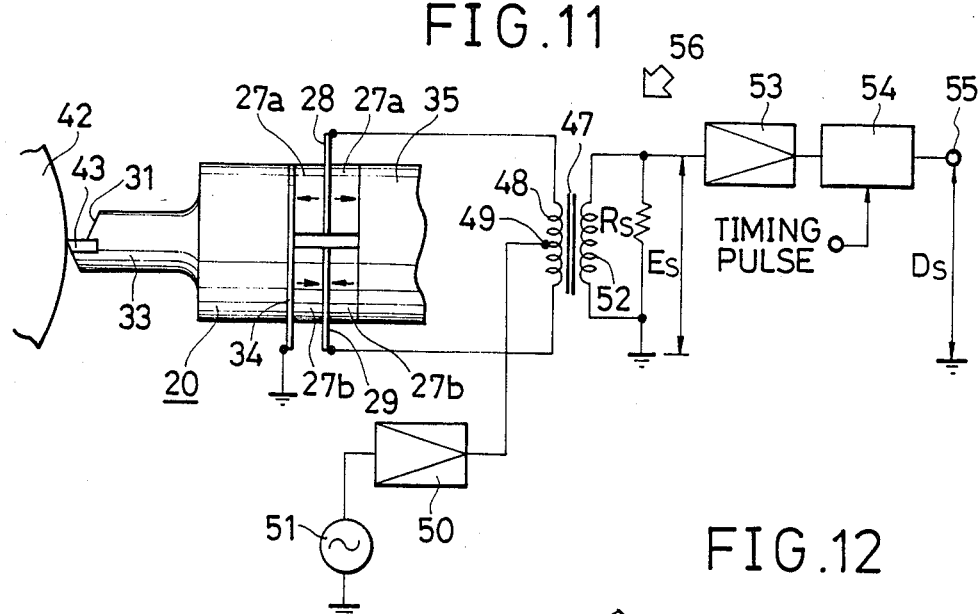
FIG. 11 is a circuit diagram of driving stage and detection stage.

The above mentioned drive control circuit will now be described. In a broad sense, there is no need of providing a separate dedicated sensor for detecting the radial force detection signal, but the electrostrictive element 27 for driving the flexural vibrator 20 itself can be used as the sensor and the signal is detected through an electrical differential detection means. A connection diagram including the differential detection means is shown in FIG. 11. Here, it is arranged such that the halved electrostrictive elements 27a, 27b of the flexural vibrator 20 are provided with inverted residual polarization with respect to each other in the direction of their thickness as indicated by the arrows. First, the electrode plates 28, 29 are connected with both ends of the primary coil 48 of a detection transformer 47. The center tap 49 of the primary coil 49 is connected with the output side of an amplifier 50. To the input side of the amplifier 50 is connected an oscillator 51, of which the other end is grounded. On the other hand, the secondary coil 52 of the detection transformer 47 is shunted by a detection resistor $R_s$ connected to its both ends, of which one end is grounded. To the other end of the detection resistor $R_s$, a synchronous detector 54 is connected via an amplifier 53. This synchronous detector 54 provides a synchronous detecting operation according to timing pulses and outputs from an output terminal 55 an output signal of the D.C. component corresponding to a detected voltage $E_s$ appearing across the detection resistor $R_s$, i.e., the radial force detection signal $D_s$.

The detection transformer 47 of a differential system, the detection resistor $R_s$, etc. constitute the differential detection means 56 using the electrostrictive elements 27a, 27b as sensors.

With the described arrangement, a signal from the oscillator 51 whose driving frequency is set to the flexural resonant frequency of the flexural vibrator 20 is amplified by the amplifier 50 and applied to the center tap 49 of the primary coil 48 of the detection transformer 47. The flexural vibrator 20 is excited in this manner, that is, driving voltages in phase with each other are applied through the primary coil 48 of the detection transformer 47 to the electrode plates 28, 29. Hence, if considered from the side of the electrostrictive elements 27a, 27b polarized in the reverse directions to each other, it is as if they are applied with driving voltages 180° out of phase. As a result, when one side of the halved electrostrictive elements 27a, or 27b, are expanded, the other side of the halved electrostrictive elements 27b, or 27a, are shrunk, whereby the flexural vibrator 20 causes a resonant vibration. Thus, the cutting tool 43 disposed at the output end portion 31 makes a large vibration in the direction perpendicular to the axis (vertical direction) by means of the step at the nodal position and performs cutting work when pressed against the rotating work piece 42.

In the process of the above described operation, when both the electrostrictive elements 27a, 27b are simultaneously subjected to a stress in the same direction, the resultant piezoelectricity generates a signal voltage across the detection resistor $R_s$. As long as a simple flexural vibration only is produced, the directions of deformation, expansion or shrinkage, effected in the electrostrictive elements 27a, 27b are opposite to each other, and therefore, no detection signal (radial force detection signal) $E_s$ is detected across the detection resistor $R_s$ against the load or force acting in the vibrating direction. In actual cutting operation, however, the flexural vibrator 20 is subjected to the radial force and thereby the same receives vibrating stress in its axial direction, and therefore, a detection signal $E_s$ is generated across the detection resistor $R_s$. Thus, absence or existence of the radial force applied to the flexural vibrator 20 is detected by being zero or not for the detection signal $E_s$. Further, in the present embodiment, the detection signal $E_s$ produced across the detection resistor $R_s$ is amplified by the amplifier 53 and then input to the synchronous detector 54, and therefore, the synchronous detecting operation is performed according to the timing pulses in agreement with the oscillating frequency of the oscillator 51. Thereby, whether the vibrating stress in the axial direction of the flexural vibrator 20 is positive or negative, that is, whether it is the radial force acting from the workpiece 42 toward the edge of the cutting tool 43 or the radial force acting from the edge of the cutting tool 43 toward the workpiece 42 can be discriminated according to the output $D_s$ from the synchronous detector 53.

Figure 10A:
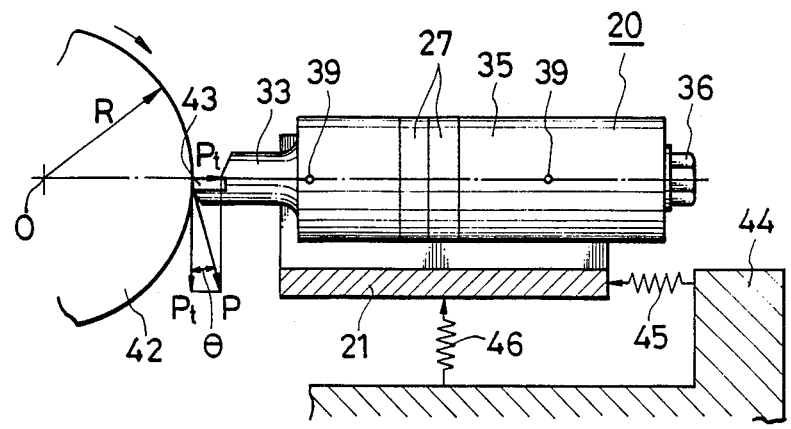
FIG. 10($a$) is a side view in longitudinal section showing a state before correction and FIG. 10($a$) is a side view in longitudinal section showing a state after correction.

Therefore, the expected result is obtained by monitoring the value of the output $D_s$ and controlling the vertical position of the cutting tool 43 so that the output $D_s$ (or $E_s$) may become zero by means of the vertical feed mechanism 46. Such a method for correction of the radial force will be described below with reference to FIG. 10. FIG. 10(a) shows a state prior to the execution of the correction of the radial force $P_t$. Namely, this is the state where the edge of the cutting tool 43 which is to vibrate perpendicularly to the axial line of the flexural vibrator 20 is in contact with the workpiece and performs the cutting work vibrating in the same direction as the tangential direction $P_c$ to the workpiece 42. Therefore, the center 0 of the workpiece 42 is on the axial line, and thus, the edge of the cutting tool 43 is subjected to the resultant P, as the cutting resistance, of the radial force $P_t$ and the tangential force $P_c$. Consequently, as described earlier with relation to the prior art example, the cutting tool 43 produces an abnormal vibration in its axial direction due to the radial force $P_t$, and the surface is thereby roughly cut. Further, the blade edge can be chipped so that the vibrational cutting effect is greatly deteriorated, and sometimes, the ultrasonic vibration does more harm than good.

Figure 10B:
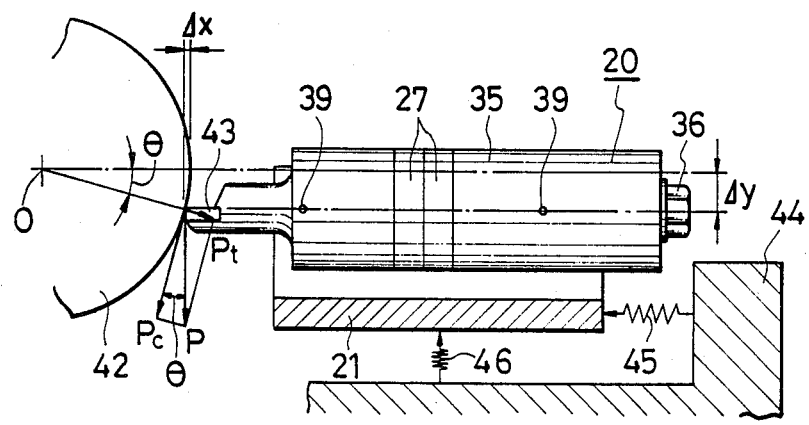

In the present embodiment, correction of the radial force $P_t$ from such a state is carried out in the manner as shown in FIG. 10(b). The flexural vibrator 20 is, first, vertically lowered by $\Delta y$ in the direction Y by means of the vertical feed mechanism 46, and at the same time, advanced by $\Delta x$ in the depth-of-cut direction, or the direction X, by means of the depth-of-cut feed mechanism 45. When the blade edge of the cutting tool 43 is brought into contact with the work piece 42, if the angle between the axial line and the line connecting the center 0 of the workpiece 42 with the cutting point is changed by an angle $\theta$, the angle of the resultant P, from that in the state prior to the correction as shown in FIG. 10(a), then, the vibrating direction of the blade edge of the cutting tool 43 comes into agreement with the direction P of the resultant, whereby a good cutting effect is obtained.

If the aforesaid state is examined in terms of the radial force $P_t$, while the edge of the cutting tool 43, in the cutting state as shown in FIG. 10(a), was subjected to the radial force $P_t$ acting in its axial direction, the edge becomes free of the radial force exerted thereon in the cutting state after the correction as shown in FIG. 10(b) has been made because the vibrating direction of the edge of the cutting tool 43 is now in agreement with the direction of the resultant P.

Therefore, it is known that the purpose is achieved by obtaining the radial force detection signal through the differential detection means 56 in the correcting operation as described above and controlling the vertical position of the edge of the cutting tool 43 by means of the vertical feed mechanism 46, while adjusting the feed in the depth-of-cut direction by means of the depth-of-cut feed mechanism, such that the radial force detection signal becomes zero.

By representing the radius of the workpiece 42 by R, there is a relationship between the amount of the vertical movement $\Delta y$ of the cutting tool 43 and the amount of movement in the depth-of-cut direction $\Delta x$ thereof expressed as $$\Delta x = R - \sqrt{(R^2 - \Delta y^2)},$$

and therefore, when the cutting tool 43 is moved by $\Delta y$ in the vertical direction, it must be moved in the depth-of-cut direction by $\Delta x$ in accordance with the above expression.

And the movement in the depth-of-cut direction, $\Delta x$, must be accompanied by the movement in the vertical direction, $\Delta y$, according to the following expression:

$$\Delta y = \sqrt{(2\Delta x \cdot R - \Delta x^2)}.$$

And, also in setting up the depth-of-cut amount, correction with an amount according to the angle of deviation $\theta$ is provided. Such operations can be easily performed by calculation control with an NC apparatus.

Now, the relationship between the radial force detection signal and the position of the cutting tool 43 will be described with reference to FIG. 10(b). When the cutting tool 43 is brought to the state in which its vertical displacement $\Delta y$ is smaller than that in the state thereof in which the radial force detection signal is made to be zero with the angle $\theta$ provided as shown in the drawing (i.e., when the tool is shifted upward), a radial force comes to be applied to the edge of the cutting tool 43 and the detection signal $E_s$ is turned to "+" side. Conversely, when the vertical displacement $\Delta y$ is made larger (i.e., when the tool is shifted downward), a radial force to cause the edge of the cutting tool 43 to be attracted toward the workpiece 42 is effected and a signal turned to "−" side is output as the detection signal $E_s$. Hence, feedback control is performed so that the vertical feed mechanism 46 is moved to increase $\Delta y$ if the detection signal is on "+" side and to decrease $\Delta y$ if, conversely, the detection signal $E_s$ is on "−" side, which is followed by the controlling by the depth-of-cut feed mechanism 45 to provide the depth-of-cut displacement corresponding to the vertical feed amount, and thereby, the detection signal $E_s$ is controlled to be constantly zero. These controlling operations are continuously performed during the course of the cutting processing.

Figure 12:
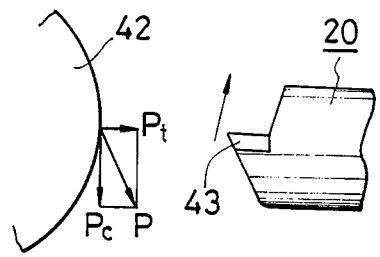
FIG. 12 is a side view schematically showing an edge of a cutting tool whose vibration is deviated from a normal vibrating direction.

In the foregoing explanation, the edge of the cutting tool 43 is described to vibrate perpendicularly to the axial line of the flexural vibrator 20, but the vibration of the edge is not always perpendicular to the axis. It frequently show slight deviation depending upon, for example, exchanged cutting tools, way of grinding the edge, its form, etc., which is considered to be a delicate disadvantage of the ultrasonic vibrational processing. According to the present embodiment, however, it is apparent from the foregoing explanation that the vibrating direction of the edge of the cutting tool 43 is controlled to agree with the direction of the resultant of the cutting resistance even if its vibrating direction is deviated from the direction perpendicular to the axial line as shown in FIG. 12. That is, in such a case, if the vibrating direction is not in agreement with the direction of the resultant P including the radial force $P_t$ from the workpiece 42, the component force in the axial direction is applied to the flexural vibrator 20, and therefore, abnormality in the vibrating direction is detected according to the detection signal $E_s$ across the detection resistor $R_s$. Thus, a good cutting condition can be set up by equalizing the action exerted by the vibration and the reaction exerted by the workpiece 42, including the deviation of the vibrating direction of the cutting tool 43 from the direction perpendicular to its axial line.

Figure 13:
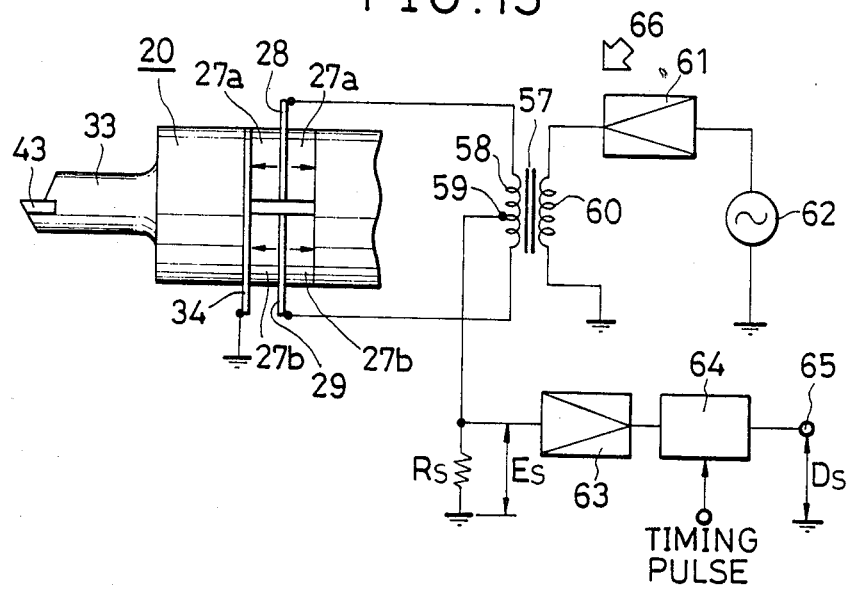
FIG. 13 is a circuit diagram showing a driving stage and detection stage of a second embodiment of the present invention.

In the case where a flexural vibrator 20 whose electrostrictive element 27 has electrostrictive element halves 27a, 27b with the residual polarization in the direction of their thickness arranged in the same direction at both sides of the dividing line is used, the same results as above can be obtained by having an arrangement as shown in the connection diagram of FIG. 13. That is, the electrode plates 28, 29 of the flexural vibrator 20 are connected with both ends of the secondary coil 58 of an output transformer 57 and the center tap 59 of the secondary coil 58 is connected with a detection resistor $R_s$, of which the other end is grounded. The primary coil 60 of the output transformer 57 is connected with an amplifier 61 and an oscillator 62, of which the other end is grounded. The detection resistor $R_s$ is connected with an amplifier 63 and a synchronous detector 64. The synchronous detector 64 is supplied with timing pulses and adapted so as to output from its output terminal 65 an output $D_s$ corresponding to the detected voltage $E_s$ from both ends of the detection resistor $R_s$. Also in this case, a differential detection means 66 with the electrostrictive elements 27a, 27b used as sensors is constituted of the output transformer 57 of a differential system, the detection resistor $R_s$, etc.

That is, the excited output obtained by amplifying the oscillating signal of the oscillator 62 by the amplifier 61 are applied to both of the electrostrictive elements 27a, 27b as voltages 180° out of phase. Therefore, when one of the electrostrictive elements 27a, or 27b, are expanded, the other electrostrictive elements 27b, or 27a, are shrunk, and thereby, a flexural resonant vibration is produced and the edge of the cutting tool 43 vibrates in the direction perpendicular to the axial line.

If, in the course of cutting processing, both of the electrostrictive elements 27a, 27b are subjected to a uniform axial vibrating stress, the same generate voltages in phase and thereby cause the detection voltage $E_s$ to be generated as the radial force detection signal across the detection resistor $R_s$. The detection voltage (radial force detection signal) $E_s$ is detected and output as $D_s$ representing the axial vibrating stress in the state of D.C. component by means of the amplifier 63 and the synchronous detector 64.

Incidentally, in practicing the present embodiment, it may also be possible to execute the correction of the radial force by tilting the cutting tool 43 by tilting the flexural vibrator 20 as mentioned in the description of the prior art after detection of the radial force detection signal.

Although the foregoing description has been made as to the example of the present invention applied to a lathe, it can be applied equally to other machine tools also such as a planer and shaper.

And further, the flexural vibrator is not limited to the design of a circular cross section, but the same can be, for example, of a square cross section.

Figure 14:
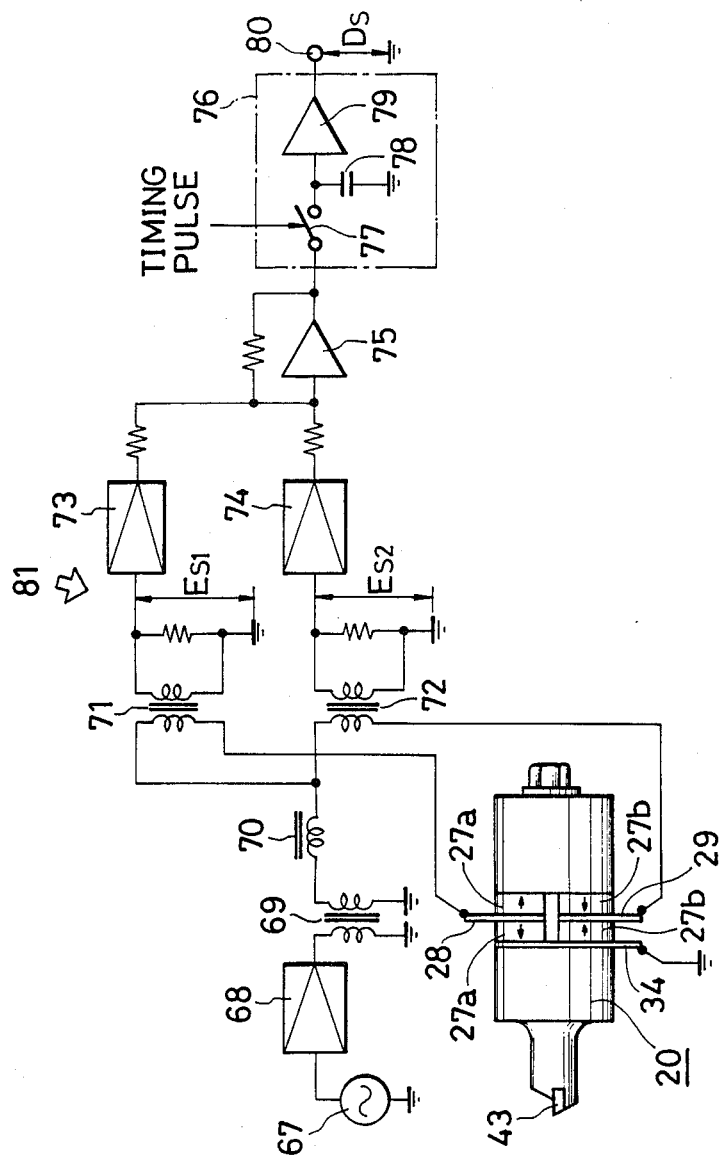
FIG. 14 is a circuit diagram showing a third embodiment of the present invention.

Now, a second embodiment of the present invention will be described with reference to FIG. 14. The present embodiment is an improvement upon the first embodiment. Namely, in the embodiment as shown in FIG. 11, if the differential characteristic of the detection transformer 47 with relation to the center tap 49 does not match with the differential characteristic of the electrostrictive elements 27a, 27b, there is a possibility that the detection voltage $E_s$ is generated even when the flexural vibrator 20 is not subjected to an axial vibration, and thereby, an erroneous detection is made to cause a radial force detection signal $D_s$ to be output. The present embodiment is devised not to produce such erroneous detection.

First, output of an amplifier 68 connected to an oscillator 67 is provided with impedance matching by means of an output transformer 69 and with conjugate matching by means of an inductance 70 connected in series therewith, and the outputs therefrom in such a matching state are supplied to the electrode plates 28, 29 through primary coils of detection transformers 71, 72, respectively. A detection voltage $E_{s1}$ generated on the secondary side of one detection transformer 71 is proportional to a current flowing through one electrostrictive element 27a and it is input to an amplifier 73. Another detection voltage $E_{s2}$ generated on the secondary side of the other detection transformer 72 is proportional to a current flowing through the other electrostrictive element 27b and it is input to a voltage-controlled amplifier 74. And, the outputs of the amplifier 73 and the voltage-controlled amplifier 74 are made to become two inputs to a differential amplifier 75. The output of the differential amplifier 75 is input to a synchronous detector 76 of a sample and hold circuit structure. This synchronous detector 76 is made up of a switch 77 continually turned ON momentarily at the timing of timing pulses in synchronism with the driving frequency of the aforesaid oscillator 67, a capacitor 78 holding momentary output voltage of the differential amplifier 75 at the ON timing of the switch 77, and an amplifier 79, and an output terminal 80 for outputting the radial force detection signal $D_s$ is led out therefrom. Thus, in the present embodiment, a differential detection means 81 is constituted by the detection transistors 71, 72 for the respective electrostrictive elements 27a, 27b, amplifier 73, voltage-controlled amplifier 74, differential amplifier 75, and so on.

With the above described arrangement, if the currents flowing through the electrostrictive elements 27a, 27b are equal, the radial force detection signal $D_s$ as the detection signal becomes zero when the amplification degrees of the amplifier 73 and the voltage-controlled amplifier 74 are equal. However, if the arrangement including the electrostrictive elements 27a, 27b and the differential circuit is unbalanced, the radial force detection signal $D_s$ is generated even when no axial vibrating stress is exerted on the vibrator and this causes errors. In the present embodiment, by adjusting the amplification degree of the voltage-controlled amplifier 74 so that the radial force detection signal $D_s$ may become zero when the flexural vibrator 20 is making its flexural vibration under no load, the arrangement inclusive of the vibrator can be corrected to be balanced. If the flexural vibrator 20 in its vibrational cutting operation is subjected to an axial vibrating stress after such correction for balancing has been made, the stress is effectively detected as the radial force detection signal $D_s$. That is, the erroneous detection due to unmatched differential characteristics of the arrangement inclusive of the electrostrictive elements 27a, 27b themselves can thus be eliminated.

The polarity of the radial force detection signal $D_s$ is reversed when the situation is changed between that under which a vibrating stress is imposed on the edge of the cutting tool 43 in the direction perpendicular to its vibration and that under which the stress acts from the blade edge toward the work piece 42. Therefore, desired results are obtained by providing automatic control by means of a feed back control mechanism including a servo motor or the like to adjust the angle of inclination of the axial line of the flexural vibrator 20 to the workpiece 42 so that the radial force detection signal $D_s$ may be kept at zero during the cutting processing.

Figure 15:
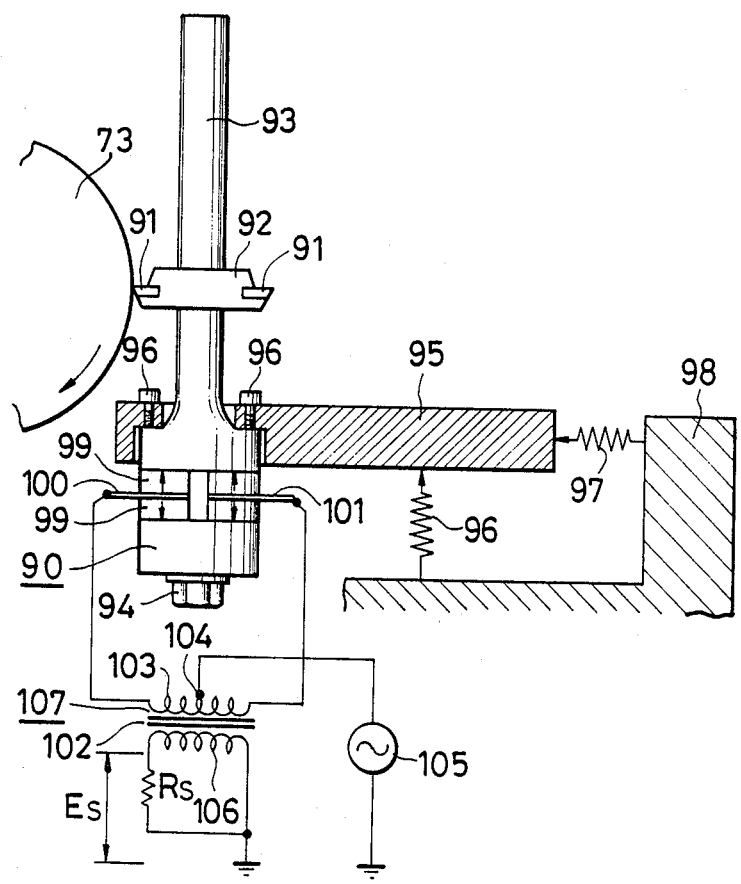
FIG. 15 is a side view in longitudinal section schematically showing a fourth embodiment of the present invention.

Now, a third embodiment of the present invention will be described with reference to FIG. 15. The vibrator used in the present embodiment is an axial vibrator 90, and this axial vibrator 90 resonates at ½ wavelength in its axial direction. The axial vibrator 90 is provided with a tool holder 92 disposed thereon at the loop position of its vibration, the holder having cutting tools 91 fixed thereon at symmetrical positions, and further provided with a resonator 93 resonating in the axial direction at ½ wavelength disposed at its end, and these are fastened together by means of a center bolt (not shown) or the like. Incidentally, reference numeral 94 denotes a bolt for fastening the electrostrictive elements together. The axial vibrator 90 is fixed at its nodal position to a holder 95 by screws 96 or the like. The holder 95 is fitted to a saddle 98 so as to be controlled in its movement in the vertical direction (direction Y) by a vertical feed mechanism 96 and to be controlled in its movement in the depth-of-cut direction (direction X) by a depth-of-cut feed mechanism 97.

The axial vibrator 90 as aforesaid differs from conventional axial vibrators in that, the same as the electrostrictive elements in the above described embodiments, two electrostrictive elements are provided, which are diametrically divided into two halves, and electrode plates 100, 101 are led out therefrom. These electrode plates 100, 101 are connected with both ends of the primary coil 103 of a detection transformer 102, and the center tap 104 of the primary coil 103 is connected with a driving power source 105. The secondary coil 106 of the detection transformer 102 is connected with a detection resistor $R_s$, of which one end is grounded. Thus, a radial force detection means is made up of such a detection transformer 102, detection resistor $R_s$, and so on.

With the described arrangement, if the axial vibrator 90 is driven by the driving power source 105 at the frequency set to its axial resonant point, the cutting tool 91 exhibits a strong resonant vibration in the axial direction together with the tool holder 92 provided at the loop of the resonant vibration. Then, if the workpiece 73 is put into contact with the edge of the cutting tool 91, a vibrational cutting operation is performed. At this time, if a radial force from the work piece 73 is exerted on the cutting tool 91, the electrostrictive element halves 99 are subjected to different stresses, and therefore, they generates voltages 180° out of phase. Thus, there is generated a radial force detection signal $E_s$ at both ends of the detection resistor $R_s$ of the radial force detection means 107.

Hence, the same as described with relation to the above embodiments, by controlling the vertical feed mechanism 96 and depth-of-cut feed mechanism 97 so that the radial force detection signal $E_s$ may become zero, it becomes possible to bring the arrangement into the state capable of effective vibrational cutting operation.

Also in the present embodiment, a stress sensor provided on the depth-of-cut feed mechanism 97, for example, may be used as the radial force detection means. Further, while the vertical feed mechanism is for varying the relative vertical position between the edge of the cutting tool and the center of rotation of the work piece, it may be provided by a vertical feed mechanism of the main spindle holding the rotating work piece.

Obviously, numerous modifications and variations of the present invention are possible in light of the above teachings. It is therefore to be understood that within the scope of the appended claims, the invention may be practiced otherwise than as specifically described herein.

What is claimed is:

1. An ultrasonic vibrational cutting apparatus for machining a workpiece, comprising:

an ultrasonic vibrator having a cutting tool located at one end thereof;

a holder for fixedly supporting said ultrasonic vibrator;

radial force detection means for detecting a radial force on said workpiece generated by cutting operation of said cutting tool by means of said ultrasonic vibrator;

a saddle member;

a depth-of-cut feed mechanism interconnecting said holder and said saddle member for moving said holder and cutting tool in a depth-of-cut direction toward said workpiece;

a vertical feed mechanism interconnecting said holder and said saddle member for moving said holder and cutting tool in a direction perpendicular to said depth-of-cut direction;

means connected to said depth-of-cut feed mechanism for correcting movement of said cutting tool in said depth-of-cut direction, at a position where a radial force detection signal detected by said radial force detection means becomes zero.

2. An ultrasonic vibrational cutting apparatus according to claim 1, wherein the correction of amount of movement in the depth-of-cut direction is executed such that the relationship $$\Delta x = R - \sqrt{(R^2 - \Delta y^2)}$$

is maintained between $\Delta y$, the amount of movement of the cutting tool in the vertical direction, and $\Delta x$, the amount of movement thereof in the depth-of-cut direction, where R represents the radius of the workpiece.

3. An ultrasonic vibrational cutting apparatus according to claim 1, wherein said ultrasonic vibrator.

4. An ultrasonic vibrational cutting apparatus, comprising:

a flexural vibrator formed by fastening together an electrostrictive element body polarized in the direction of its thickness and divided into equal halves and metallic members disposed on both faces of said element;

a cutting tool disposed at an axial output end portion of said flexural vibrator; and differential detection means for detecting axial vibrating stress applied to the two halves of said electrostrictive element body at the same phasic timing.

5. An ultrasonic vibrational cutting apparatus according to claim 4, further comprising a vertical feed mechanism for moving said flexural vibrator in the direction perpendicular to the depth-of-cut direction toward a workpiece thereby to move said flexural vibrator at the position where a detection signal detected by said differential detection means becomes zero.

6. An ultrasonic vibrational cutting apparatus according to claim 4, further comprising a tilting table for setting the inclination of the axial line of said flexural vibrator in the direction angle in which a detection signal detected by said differential detection means becomes zero.

* * * * *